US009098566B2

(12) United States Patent
Srinivasan et al.

(10) Patent No.: US 9,098,566 B2
(45) Date of Patent: Aug. 4, 2015

(54) METHOD AND SYSTEM FOR PRESENTING RDF DATA AS A SET OF RELATIONAL VIEWS

(75) Inventors: Jagannathan Srinivasan, Nashua, NH (US); Yongmei Xie, Beijing (CN); Jayanta Banerjee, Nashua, NH (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 983 days.

(21) Appl. No.: 13/114,965

(22) Filed: May 24, 2011

(65) Prior Publication Data

US 2012/0303668 A1 Nov. 29, 2012

(51) Int. Cl.
*G06F 17/30* (2006.01)
(52) U.S. Cl.
CPC .... *G06F 17/30604* (2013.01); *G06F 17/30292* (2013.01)
(58) Field of Classification Search
CPC ............... G06F 17/30569; G06F 17/30604; G06F 17/30292
USPC ................................................. 707/792, 756
See application file for complete search history.

(56) References Cited

U.S. PATENT DOCUMENTS

| 8,078,646 B2 | 12/2011 | Das et al. | |
|---|---|---|---|
| 2006/0235823 A1* | 10/2006 | Chong et al. | 707/1 |
| 2011/0225167 A1* | 9/2011 | Bhattacharjee et al. | 707/747 |

OTHER PUBLICATIONS

K. Stoffel, M. Taylor, J. Hendler. *Efficient Management of Very Large Ontologies*. AAAI/MIT Press 1997.
Zhengxiang Pan, Jeff Heflin: DLDB: *Extending Relational Databases to Support Semantic Web Queries*. PSSS 2003.
S. Alexaki, V. Christophides, G. Karvounarakis, D. Plexousakis & K.Tolle, *On Storing Voluminous RDF Description: The case of Web Portal Catalogs,* WebDB 2001.
W.Teswanich, S,Chittayasothorn, "A Transformation of RDF Documents & Schemas to Relational Databases", IEEE PacificRim Conferences on Communications, Computers, & Signal Processing, 2007.
S. Ramanujam, A. Gupta, L. Khan, S. Seida, B. M. Thuraisingham: R2D:Extracting Relational Structure from RDF Stores. Web Intelligence 2009: 361-366.
S. Ramanujam, A. Gupta, L. Khan, S. Seida, B. M. Thuraisingham:R2D: *A Bridge between the Semantic Web and Relational Visualization Tools.* ICSC 2009: 303-311.
Souripriya Das, et al. ED, "R2RML: RDB to RDF Mapping Language," Oct. 28, 2010, http://www.w3.org/Tr/2010/WD-r2rm1-20101028/ (22 pages).
Marcelo Arenas, et al. Ed, "A Direct Mapping of Relational Data to RDF," Mar. 24, 2011, http://www.w3.org/TR/2011/WD-rdb-direct-mapping-20110324/ (18 pages).
Sören Auer, et al., Ed, "Use Cases and Requirements for Mapping Relational Databases to RDF," Jun. 8, 2010, http://wvvw.w3.org/TR/rdb2rdf-ucr/ (20 pages).

(Continued)

*Primary Examiner* — Alexey Shmatov
(74) *Attorney, Agent, or Firm* — Vista IP Law Group, LLP

(57) ABSTRACT

Disclosed is an approach for presenting RDF data as a set of relational views. By presenting the RDF data as relational views, this permits integrated access to the RDF-based data from existing relational database tools, such as by asserting SQL queries against the relational views. One or more classes are identified within the RDF data, wherein a relational view of the set of the relational views maps properties relating to a particular class.

41 Claims, 13 Drawing Sheets

(56) References Cited

OTHER PUBLICATIONS

"Relational Databases on the Semantic Web," Sep. 1999, http://www.w3.org/DesignIssues/RDB-RDF.html (6 pages).

Satya S. Sahoo, et al. "A Survey of Current Approaches for Mapping of Relational Databases to RDF," Jan. 8, 2009, http://www.w3.org/2005/Incubator/rdb2rdf/RDB2RDF Survey Report (15 pages).

Ashok Malhotra, Ed, "W3C RDB2RDF Incubator Group Report," Jan. 26, 2009, http://www.w3.org/2005/ir batorirdb2rdf/XGR-rdb2rdf-20090126/ (6 pages).

RDB2RDF W3C Standards and Notes, Accessed Jul. 1, 2013, http://www.w3.org/2001/slerdb2rdfi (3 pages).

Deborah L. McGuinness, et al. Ed, "Owl Web Ontology Language," Feb. 10, 2004, http://www.w3.org/TR/owl-features/ (15 pages).

Frank Manola, et al. Ed, "RDF Primer," Feb. 10, 2004, http://www.w3.org/TR/rdf-primes/ (89 pages).

"RFD 2396: Uniform Resource Identifiers (URI): Generic Syntax," Aug. 1998, http://www.ietf.org/rfc/rfc2396.txt (28 pages).

Dan Brickley, et al., Ed, "RDF Vocabulary Description Language 1.0: RDF Schema," Oct. 2, 2004, http//www.w3.org/TRIrdf-schema/ (21 pages).

* cited by examiner

Figure 8

```
:John    rdf:type      :student
:John    :age          18
:Jill    rdf:type      :student
:Jill    :age          20
:Jill    :friendOf     :John
:Mary    rdf:type      :student
:Jill    :friendOf     :Mary
:Mike    :worksFor     :Oracle
:Mike    :hasPosition  :Manager
:Lisa    :worksFor     :Oracle
:Lisa    :hasPosition  :CEO
```

← 200

```
CREATE OR REPLACE VIEW v_friendOf AS
SELECT s Student1, o Student2
FROM TABLE(SEM_MATCH('{ ?s rdf:type :student .
                        ?s :friendOf ?o .
                        ?o rdf:type :student}',
    SEM_MODELS('students'), NULL, NULL, NULL,
NULL));
```

| Student1 | Student2 |
|----------|----------|
| :Jill    | :John    |
| :Jill    | :Mary    |

| Subject | Predicate | Object |
|---------|-----------|--------|
| :Mike | :worksfor | :Oracle |
| :Mike | :hasposition | :Manager |
| :Lisa | :worksfor | :Oracle |
| :Lisa | :hasposition | :CEO |

Unmapped Triples View 1002

METHOD AND SYSTEM FOR PRESENTING RDF DATA AS A SET OF RELATIONAL VIEWS

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

RDF is a widely-used language that was originally developed for representing information (metadata) about resources in the World Wide Web. It may, however, be used for representing information about absolutely anything. When information has been specified using the generic RDF format, it may be consumed automatically by a diverse set of applications.

There are two standard vocabularies defined on RDF: RDF Schema (RDFS) and the Web Ontology Language (OWL). These vocabularies introduce RDF terms that have special semantics in those vocabularies. For simplicity, in the rest of the document, our use of the term RDF will also implicitly include RDFS and OWL. For more information and for a specification of RDF, see *RDF Vocabulary Description Language 1.0: RDF Schema*, available at www.w3.org/TR/rdf-schema/, *OWL Web Ontology Language Overview*, available at www.w3.org/TR/owl-features/, and Frank Manola and Eric Miller, *RDF Primer*, published by W3C and available in Sept., 2004 at www.w3.org/TR/rdf-primer/. The *RDF Vocabulary Description Language 1.0: RDF Schema*, *OWL Web Ontology Language Overview*, and *RDF Primer* are hereby incorporated by reference into the present patent application.

Facts in RDF are represented by RDF triples. Each RDF triple represents a fact and is made up of three parts, a subject, a predicate (sometimes termed a property), and an object. For example, the fact represented by the English sentence "John is 24 years old" can be represented in RDF by the subject, predicate, object triple <'John', 'age', '24'>, with 'John' being the subject, 'age' being the predicate, and '24' being the object. In the following discussion, the values in RDF triples are termed lexical values.

With RDF, the values of predicates must ultimately resolve to lexical values termed universal resource identifiers (URIs), and the values of subjects must ultimately resolve to lexical values termed URIs and blank nodes. A URI is a standardized format for representing resources on the Internet, as described in *RFD 2396: Uniform Resource Identifiers (URI): Generic Syntax*, www.ietf.org/rfc/rfc2396.txt. RFD 2396 is hereby incorporated by reference into the present patent application. In the triples, the lexical values for the object parts may be literal values. In RDF, literal values are strings of characters, and can be either plain literals (such as "Immune Disorder") or typed literals (such "2.4"^^ Axsd:decimal). The interpretations given to the lexical values in the members of the triple are determined by the application that is consuming it. For a complete description of RDF, see Frank Manola and Eric Miller, *RDF Primer*, published by W3C and available in September 2004 at www.w3.org/TR/rdf-primer/. The *RDF Primer* is hereby incorporated by reference into the present patent application.

In contrast to the URI approach of RDF data, relational database management systems (RDBMSs) store information in tables, where each piece of data is stored at a particular row and column. Information in a given row generally is associated with a particular object, and information in a given column generally relates to a particular category of information. For example, each row of a table may correspond to a particular employee, and the various columns of the table may correspond to employee names, employee social security numbers, and employee salaries. A user retrieves information from and makes updates to a relational database by interacting with a RDBMS application. Queries that are submitted to the RDBMS server must conform to the syntactical rules of a database query language, where one popular database query language, known as the Structured Query Language (SQL), provides users a variety of ways to specify information to be retrieved from relational tables.

Relational-based systems are the most common commercially available database systems now being used today. As such, there is a deep pool of existing relational-based tools and products that are now owned or used by organizations and individuals to access and analyze the relational data. However, because these tools are designed to work with relational-based data, such tools cannot be used to directly access and analyze the RDF-based data. The problem is that more and more data are being placed into RDF-based databases everyday. For example, RDF/OWL repositories are increasingly being created by government agencies, e.g., Data.gov, SNOMED, and DBPedia.

Therefore, there is a need for an improved approach for allowing integrated access to RDF-based data from relational-based tools.

SUMMARY

Some embodiments of the present invention are directed to an approach for presenting RDF data as a set of relational views. By presenting the RDF data as relational views, this permits integrated access to the RDF-based data from relational tools.

Further details of aspects, objects, and advantages of the invention are described below in the detailed description, drawings, and claims. Both the foregoing general description and the following detailed description are exemplary and explanatory, and are not intended to be limiting as to the scope of the invention.

BRIEF DESCRIPTION OF THE DRAWINGS

FIG. 8 illustrates formation of a view definition for multi-valued property according to an embodiment of the invention.

FIG. 10 illustrates a view of unmapped triples according to an embodiment of the invention.

DETAILED DESCRIPTION

Some embodiments of the present invention are directed to an approach for presenting RDF data as a set of relational views. By presenting the RDF data as relational views, this permits integrated access to the RDF-based data from relational tools.

Figure 1:
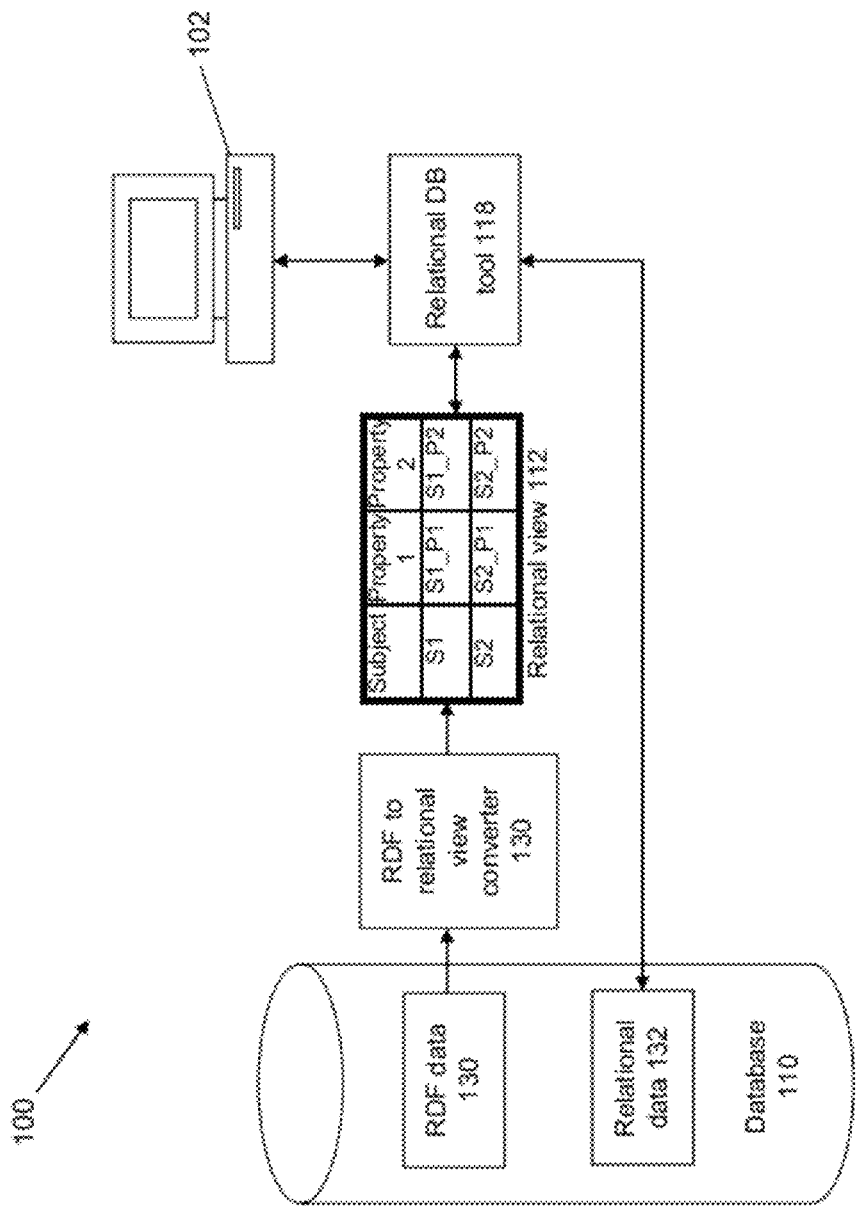
FIG. 1 illustrates an example system according to an embodiment of the invention.

FIG. 1 shows an architecture of a system 100 for presenting RDF data as relational views according to some embodiments of the invention. System 100 may include one or more users at one or more user stations 102 that operate the system 100 to use a database tool 118 to access and analyze data in a database 110. The users at user station 102 correspond to any individual, organization, or other entity that uses system 100 for utilizing database tool 118. User station 102 comprises any type of computing station that may be used to operate or interface with DBMS 118. Examples of such user stations 102 include for example, workstations, personal computers, or remote computing terminals. User station 102 comprises a display device, such as a display monitor, for displaying information and data to users at the user station 102. User station 102 also comprises one or more input devices for the user to provide operational control over the activities of system 100, such as a mouse or keyboard to manipulate a pointing object in a graphical user interface.

RDF data 130 and/or relational data 132 may be stored in database 110 on one or more computer readable mediums or storage devices. The computer readable storage devices comprise any combination of hardware and software that allows for ready access to the data within database 110. For example, the computer readable storage device could be implemented as computer memory or disk drives operatively managed by an operating system.

As previously discussed, the RDF data 130 is formatted using the RDF language such that facts in this language are represented by RDF triples. Each RDF triple represents a fact and is made up of three parts, a subject, a predicate, and an object.

The database tool 118 that seeks to access the RDF data 130 may be an application or software that is configured to operate with, and expects to see, only relational data. For example, the database tool 118 may be existing relational publishing, reporting, or business intelligence (BI) tools. A user at user station 102 may wish to use the existing relational-based database tools 118 to access the RDF data 130 in addition to the relational-based data 132.

According to some embodiments of the invention, a RDF to relational view converter mechanism 130 is provided to present the RDF data 130 as a set of one or more relational views 112. In relational database systems, a "view" is a set of data based on a query that can be accessible as if it is a virtual table composed of the results of the query. The view may be either a materialized or a non-materialized view, in which the materialized view results in an instantiation of the view as a stored database object. By presenting the RDF data 130 as a set of relational views 112, this effectively allows the data within relational views 112 to be visible in a relational format (i.e., the data in relational view 112 organized into rows and columns), and hence accessible to the relational-based database tools 118. This is because even though database tools 118 can only operate upon relational data, these database tools 118 can now analyze the RDF data 130 since the RDF data 130 is now presented as relational data within relational views 112.

Figure 2:
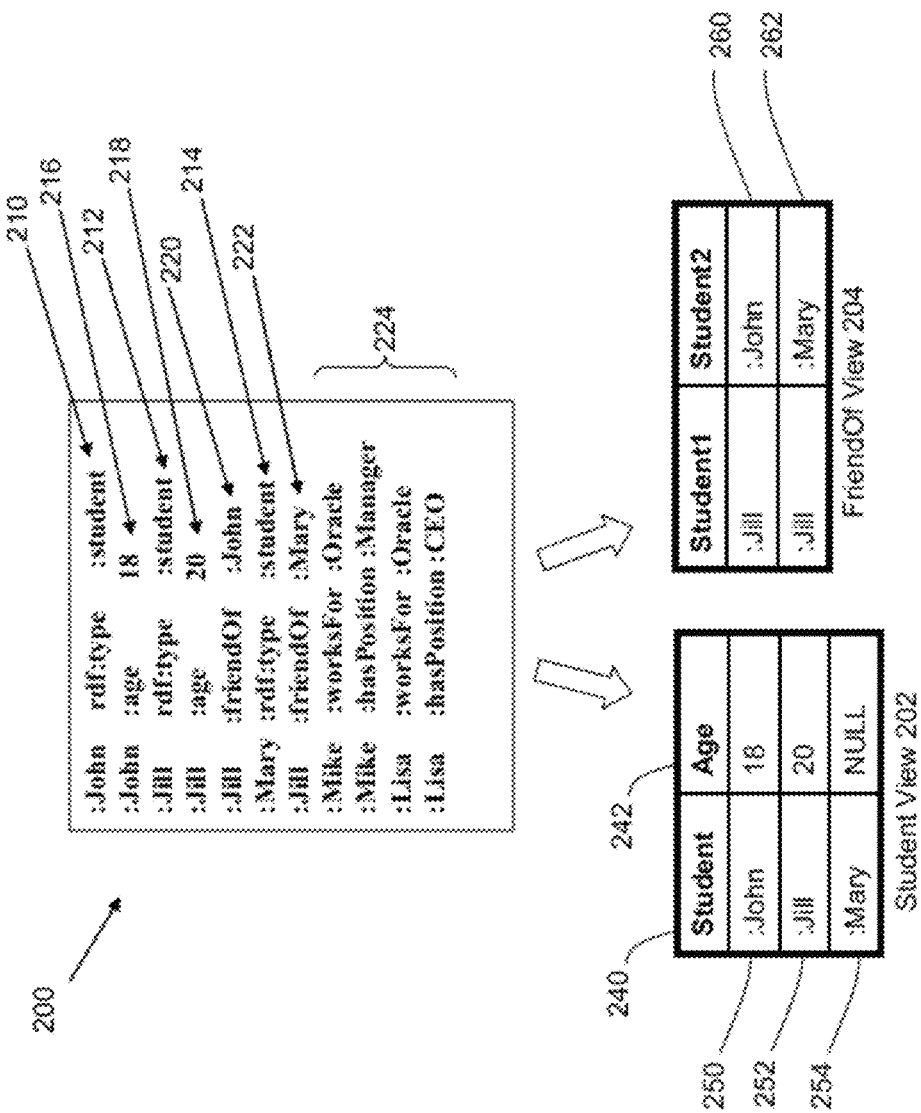
FIG. 2 illustrates RDF data presented as relational views according to an embodiment of the invention.

FIG. 2 illustrates this concept of presenting RDF data as a set of relational views. This figure shows RDF data 200, in which the RDF data 200 is organized as a set of RDF triples. A typical relational-based database tool will be unable to adequately operate upon the RDF data 200, since this data is not organized with a tabular format having consistent relationships between the rows and columns.

According to some embodiments of the invention, a very efficient approach can be taken to present or convert some or all of the RDF data 200 into relational views 202 and 204, such that the relational views present the RDF data as organized sets of relational data.

In particular, the present embodiment takes advantage of certain classes or types of data that are self-identified within the RDF data 200, and uses that identification of a class or type to populate the relational views. For example, data items 210, 212, and 214 within RDF data 200 all identify certain subjects as belonging to the same class ":student". Each of these identified classes can then be used to create a relational view that is based upon these classes. Here, this identified class ":student" would correspond to a view 202 to hold data about the members of this class. The columns in this view 202 would include a first "student" column 240 to store the subject identification (or primary key) for the students in the view 202. Additional rows would exist in view 202 to hold single-valued properties of the subjects in view 202. For example, column 242 includes the value for the "age" property for each subject in the view 202. Each row in view 202 would correspond to a different subject/student from the set of RDF data 200.

Here, row 250 in view 202 corresponds to the subject ":John" from RDF data item 210. The "age" property 242 for the ":John" subject is identified from the RDF data item 216. Similarly, row 252 corresponds to the subject ":Jill" from RDF data item 212. The "age" property 242 for the ":Jill" subject is identified from the RDF data item 218. Likewise, row 254 corresponds to the subject ":Mary" from RDF data item 214. The value of the "age" property 242 for the ":Mary" subject is "NULL", since this subject does not have an RDF data item that corresponds to this attribute.

There may be certain items within RDF data 200 that relate to multi-valued attributes for the subjects of view 202. For example, RDF data items 220 and 222 both identify different values for the attribute "friendsof" for the subject ":Jill". In particular, RDF data item 220 identifies ":John" as a "friendof" the subject ":Jill". Similarly, RDF data item 222 also relates to ":Jill", and identifies ":Mary" as a "friendof" the subject ":Jill".

The multi-valued attributes for the subjects of view 202 may either be stored into the main view 202 or placed into a separate multi-valued view 204. FIG. 2 shows the approach in which values for multi-valued attribute "friendof" is placed into a separate view 204. In particular, row 260 in view 204 corresponds to the RDF data item 220 and row 262 in view 204 corresponds to the RDF data item 222.

Certain RDF data items 224 within RDF data 200 may not correspond to a self-identified class/type or to an attribute of an identified subject of a class/type. As described below, these unmapped RDF triples can be handled in several possible ways to make them separately accessible to a relational database tool.

Once the RDF data 200 has been organized into these relational views 202 and 204, any relational-based tool can then easily access that data by asserting a SQL-based relational query against those view(s). This provides the advantage of easily permitting existing relational-based tools to access RDF-based data. Moreover, there are performance improvements that may exist as well, since many RDF databases are implemented into multiple interrelated tables that require linking and translations between the table to obtain the appropriate lexical values for the RDF data, which is significantly less efficient to access than relational view such as 202 and 204 that directly include the lexical values in the view with built-in relationships between the lexical values of the properties and their associated subjects.

Figure 3:
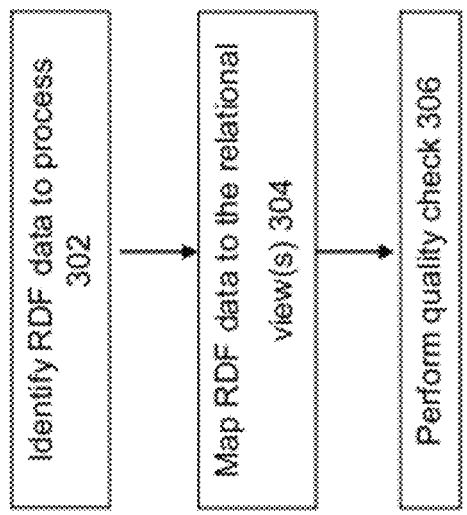
FIG. 3 shows a flowchart of an approach for presenting RDF data as relational views according to an embodiment of the invention.

FIG. 3 shows a high-level flowchart of an approach for presenting RDF data as a set of relational view(s) according to an embodiment of the invention. At 302, identification is made of the RDF data which is to be presented as a relational view. This may be any set of data in the RDF format which may be accessed by a relational-based tool or product.

At 304, the identified RDF data is mapped to one or more relational views. This action is taken to create the view definition that is used to generate the set of data to populate the rows and columns of the one or more views. The views may either be materialized or non-materialized views. The views can then be accessed by any relational-based tool that expects to operate upon relational data.

The view definitions can also be used to export subsets of RDF/OWL data in relational formats, e.g., to export the RDF-based relational data to embedded databases for building semantic applications on mobile devices. Often such devices only support SQL relational data, but not RDF data. In addition, the view definitions can be used to identify pockets of relational structure, for which materialized views can be created to speed up processing of SQL table function based SPARQL queries.

At 306, one or more quality checks may be performed to verify the effectiveness of the process for presenting the RDF data as relational views. This action can optionally be taken as a measure of how well the transformation has performed from the RDF data to the relational views. The results of the quality check can also be used to identify and correct inefficient transformation configurations, such that additional iterations of 302 and 304 are performed to increase the eventual efficiency of the process for transforming the RDF data into relational views.

Figure 4:
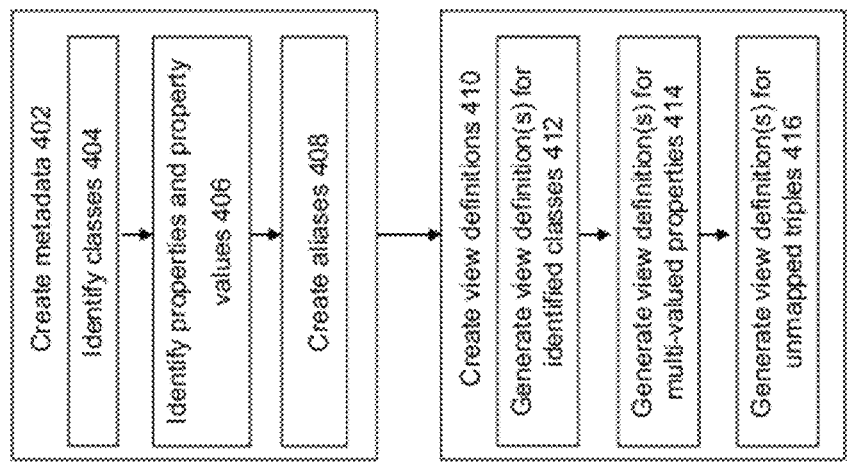
FIG. 4 shows a more detailed flowchart of an approach for presenting RDF data as relational views according to an embodiment of the invention.

FIG. 4 shows a more detailed flowchart of an approach for mapping the RDF data to relational views according to some embodiments of the invention. At 402, metadata is created to identify information from the RDF data that is used establish the relational views. A "SPARQL" based declarative approach may be performed to glean the appropriate schema information from the RDF data. SPARQL refers to a W3C standard that has been established as a query language for RDF data. More details regarding the SPARQL standard can be obtained form the W3C organization at http://www.w3.org/TR/rdf-sparql-query/.

In particular, at 404, the query can be issued against the RDF data to identify classes within the RDF data. As previously noted, the classes may be self-identified within the RDF data based on the "rdf:type" relationships in the RDF data. Therefore, queries may be performed to identify such relationships in the RDF data.

Figure 5:
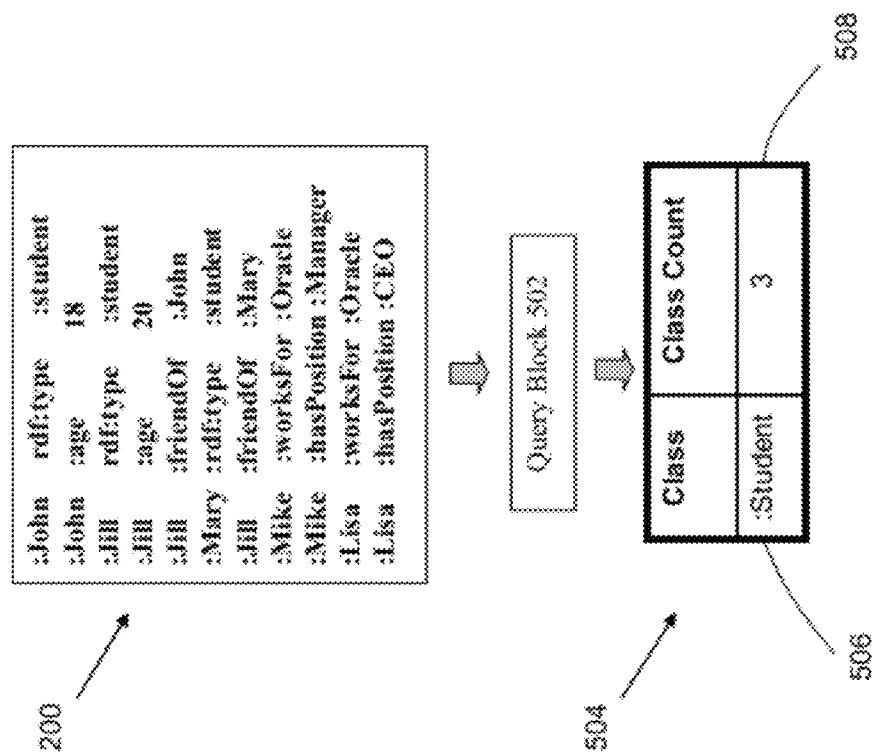
FIG. 5 illustrates identification of metadata for class information according to an embodiment of the invention.

In some embodiments, the class information can be generated using one or more SPARQL graph patterns. This is illustrated in the example of FIG. 5, a query block 502 is used to identify the classes within the RDF data 200. As previously noted, the class ":student" is can be identified within the RDF data 200 using the predicate "rdf:type". The following example SPARQL statement can be used to identify these classes within RDF data 200:

{?s rdf:type ?class}

In the context of a relational-based tool to generate a relational view, it is possible that this SPARQL query may need to be embedded within a SQL statement. Table functions may be used in some embodiments to embed such SPARQL queries within a SQL statement. The following SQL statement uses the term "SEM_MATCH( )" to refer to a table function to enable embedding of such SPARQL queries within a SQL statement:

```
SELECT class, COUNT(*)
FROM TABLE(SEM_MATCH(
    '{?s rdf:type ?class}', SEM_MODELS('students'), null,null))
GROUP BY class
```

This SQL statement can be used as query block 502 to generate the metadata 504 from the RDF data 200. In particular, this SQL statement queries the RDF data 200 (using the SPARQL query), and identifies all classes corresponding to the "rdf:type" predicate. This identifies the "student" class 506 within metadata 504, since the object ":Student" is associated with the "rdf:type" predicate in RDF data 200. In addition, a count value 508 is made of the number of subjects that correspond to a given class. Here, subjects ":John", ":Jill", and ":Mary" are all subjects associated with the ":Student" class. Since there are three of these subjects, the count value of "3" is placed in field 508 of metadata 504. This type of count value is maintained in order to help decide nullability, and quality metrics. For example, if the row count of a table turns out to be higher than the number of values for a subject-property combination, then the property may be nullable.

Returning back to FIG. 4, at 406, additional queries may be utilized to identify property/attribute information from the RDF data. For example, such property information may include information about the single value properties, nullability, and the multi-valued properties for the identified classes.

Figure 6:
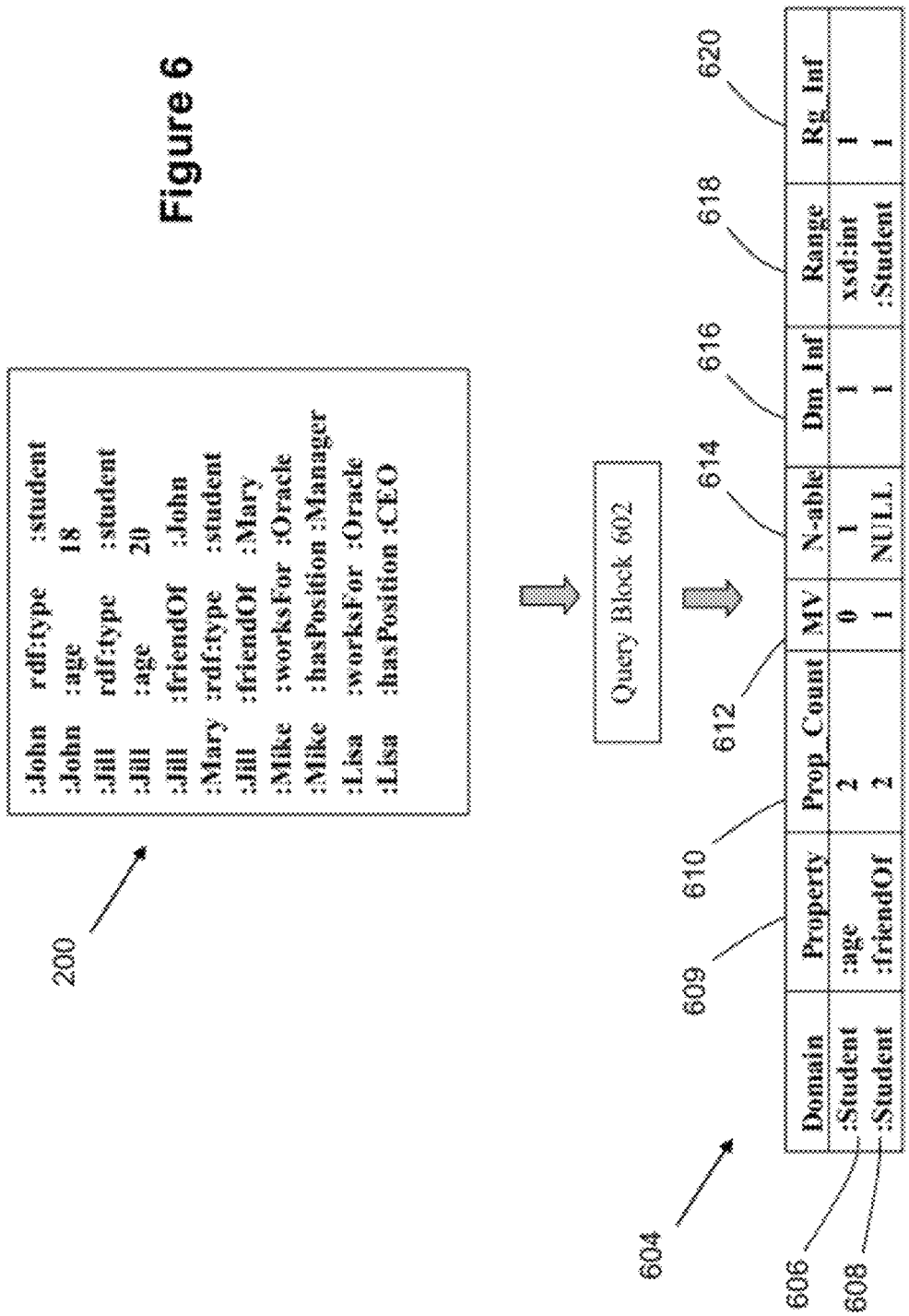
FIG. 6 illustrates identification of metadata for property information according to an embodiment of the invention.

As shown in the example of FIG. 6, the property information may be identified from the RDF data 200 using a query block 602. Similar to the approach described with respect to FIG. 5, the approach of FIG. 6 can also use one or more SPARQL graph pattern(s) to obtain the property information from the RDF data 200. In some embodiments, since they may be regular SPARQL queries, the schema information may be gleaned declaratively from the dataset. As before, the query block 602 may include the SPARQL query embedded as part of a SQL statement, e.g., within a SEM MATC_H( ) table function.

Metadata 604 can be generated to identify the property information. Metadata 604 may include a separate section/row for each identified property of a given class. Here, row 606 corresponds to the ":age" property and row 608 corresponds to the ":friendof" property (which are identified in column 609 of metadata 620). Column 610 tracks the count of the number of data items in RDF data 200 that correspond to the given property.

Column 612 identifies whether or not the property is a multi-valued property. Here, it can be seen that the ":age" property is a single-valued property, since each student/subject is only associated with a single age value in the RDF data 200. Therefore, a value of "0" is placed in column 612 for the ":age" row 606 to indicate that this property is a single-valued property. However, the ":friendof" property is a multi-valued property, since the RDF data shows that a student/subject may be associated with multiple friendof values (e.g., the student ":Mary" is associated with multiple ":friendof" objects in RDF data 200). Therefore, a value of "1" is placed in column 612 for the ":friendof" row 608 to indicate that this property is a multi-valued property.

Column 614 states whether a column created for a table may have null values. If there is no triple asserted for a subject-property combination, then the corresponding column of the associated table is nullable (indicated by '1', which means "true" while non-nullable would be "0" which means "false"). Column 618 indicates the range of values a property may have. For example, a student's age may only be integers (represented with XML standard notation xsd:int), while a student's friend-of property may only refer to some other student. Columns 616 and 620 indicate whether the domain and range information have been inferred or asserted. If range was asserted through a triple (:age rdfs:range xsd:int) then the Rg_Inf column will show a value 0, because the range was explicitly a part of the RDF data 200. Since the range for age had to be inferred in this example, the Rg_Inf column is 1.

Returning back to FIG. 4, at 408, aliases may be created, which are used to identify the relational views. For example, aliases may be created for each identified class to correspond to the view definition for that class. Similarly, an alias can be created to correspond to the view definition for the identified multi-valued properties.

At 410, one or more view definitions may be created for the identified classes and properties. In some embodiments, lexical value based relational views are generated using a SQL table function based SPARQL queries for each of the classes and its properties.

Figure 7:
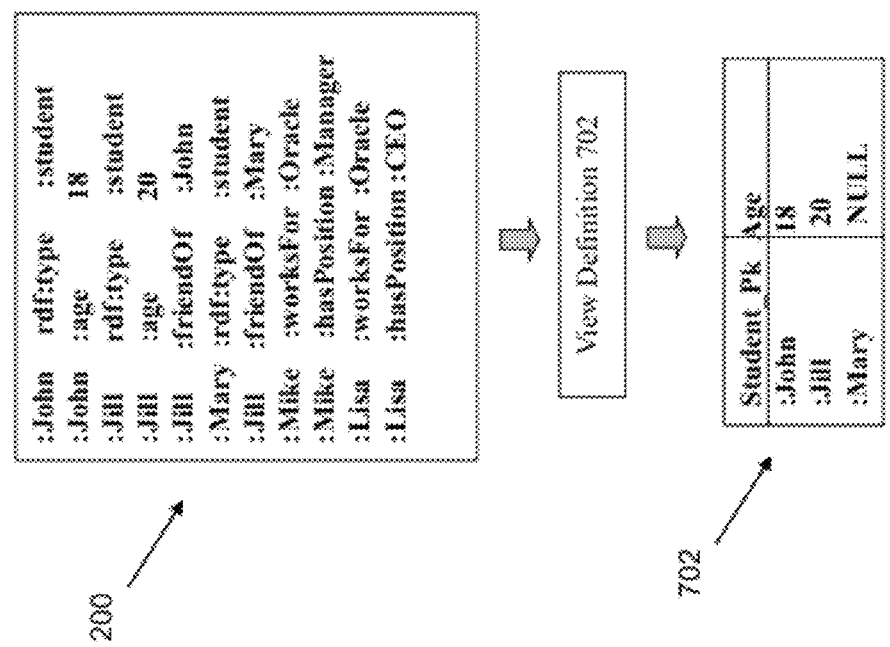
FIG. 7 illustrates formation of a view definition for a class according to an embodiment of the invention.

At 412, view definition(s) are created for the identified classes, where a class can be mapped to a view with columns corresponding to each of the single-valued properties that were previously identified. As shown in the example of FIG. 7, the view definition 702 can be created to generate a relational view for the identified ":student" class from the RDF data 200. One or more SPARQL graph pattern(s) may be used to query the RDF data 200 to define the subset of data from the RDF data 200 that correspond to the identified classes and its single-valued properties. For a NULL-able column OPTIONAL clause is generated for matching. The view definition 702 may include the SPARQL query embedded as part of a SQL statement, e.g., within a SEM_MATCH( ) table function. The following is an example of a SQL statement having an embedded SPARQL query that may be used as a view definition for the ":student" class:

```
CREATE OR REPLACE VIEW v_Student AS
SELECT i student_pk, Age
FROM TABLE(SEM_MATCH('{ i rdf:type :student .
    OPTIONAL (i :Age ?Age } }',
    SEM_MODELS('students'), NULL, NULL, NULL));
```

At 414, view definition(s) are created for the identified multi-valued properties. A multi-valued property can be implemented with maps to a two column view (subject, object). FIG. 8 shows an example of an approach for creating a view definition for the RDF data 200. As shown in this example, the view definition 802 can be created to generate a relational view for the multi-valued ":friendof" property from the RDF data 200. One or more SPARQL graph pattern(s) may be used to query the RDF data 200 to define the subset of data from the RDF data 200 that correspond to this property. As before, the view definition 802 may include the SPARQL query embedded as part of a SQL statement, e.g., within a SEM_MATCH( ) table function. The following is an example of a SQL statement having an embedded SPARQL query that may be used as a view definition for the ":friendof" property:

```
CREATE OR REPLACE VIEW v_friendOf AS
SELECT s Student1, o Student2
FROM TABLE(SEM_MATCH('{ ?s rdf:type :student .
    ?s :friendOf ?o
    ?o rdf:type :student}',
    SEM_MODELS('students'), NULL, NULL, NULL));
    NULL));
```

As shown in FIG. 2, after relational views 202 and 204 have been defined for the classes and class properties, it is possible that there remains a set 224 of one or more unmapped RDF triples within the RDF data 200. At 416 of FIG. 4, view definitions may be generated for the unmapped RDF triples. There are different possible approaches that can be taken to address the unmapped triples.

Figure 9B:
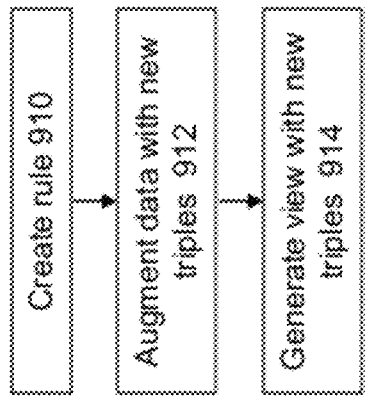
FIGS. 9A and 9B illustrate flowcharts of approaches for presenting unmapped RDF data as relational views according to an embodiment of the invention.
Figure 9A:
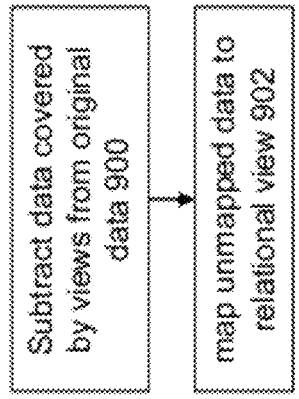

As described in FIG. 9A, one possible approach is to create a single view to hold all of the unmapped RDF triples. This approach is implemented, at 900, by subtracting the RDF triples covered by the existing views from the RDF triples in the original RDF data. At 902, the remaining RDF data is then mapped to a special relational view that holds the unmapped triples. The following example statement can be used to perform these actions to frine a view for the unmapped RDF triples:

```
CREATE VIEW v_Unmapped AS
SELECT s, p, o FROM TABLE(SEM_MATCH('{?s ?p ?o}',
sem_models('Student'), NULL, NULL, NULL))
MINUS
(SELECT * FROM TABLE(get_rdf('V_Student'))
UNION
(SELECT * FROM TABLE(get_rdf('V_friendOf')))
```

This view definition results in the view 1002 shown in FIG. 10. The unmapped triples view 1002 includes three columns. A first column 1004 includes the subject value. The second column 1006 includes the predicate value. The third column 1008 includes the object value. All of the unmapped triples are mapped into this view 1002.

FIG. 9B shows an alternate approach that can be taken to address the unmapped triples. This approach uses rules (e.g., user-defined rules) to infer classes and/or properties from the RDF data. The RDF data would be augmented with new triples (e.g., "s rdf:type :class" triples) to correspond with the new classes that are inferred in the RDF data.

At 910, one or more rules are created for the new classes/properties. In some embodiments, this action is performed by creating a new model (RDF dataset) corresponding to the unmapped triples that were previously identified. Property groups may then be identified or specified by the user. For subjects having a property group, a SPARQL pattern based user-defined rule is introduced, e.g., having the following form:

(?s ?p1 ?o1 . ?s ?p2 ?o2 . ?s p5 ?o5)=>(?s rdf:type :class)

Entailments are created for this new rule. Thereafter, at 912, the RDF data is augmented with the new triples, e.g., automatically based on the entailments. Since the RDF data now includes "rdf:type" statements for these new classes, the above-described approach can then be used at 914 to generate view definitions for these classes.

Figure 11:
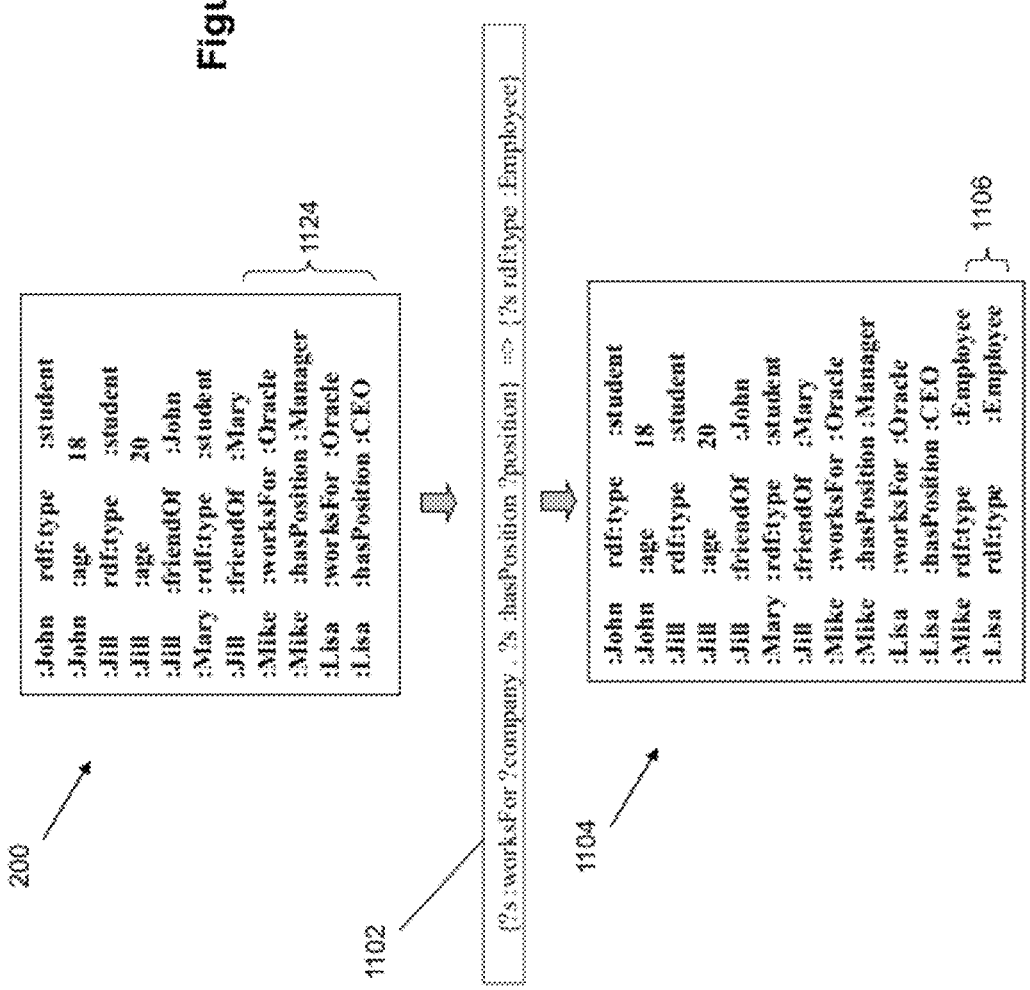
FIGS. 11 and 12 illustrate an approach for mapping unmapped RDF triples according to an embodiment of the invention.

To illustrate, consider the set 1124 of unmapped RDF triples shown in FIG. 11. The distinct properties for these unmapped triples 1124 are ":worksFor" and ":hasPosition". Therefore, one possible rule that can be suggested for this set 1124 of unmapped triples is rule 1102. Rule 1102 essentially states that a subject that corresponds to the "works for" property that identifies an employer, and which holds a position defined by the "hasposition" property, should therefore be considered to be in an "Employee" class.

As such, an entailment can be created for this rule 1102, which can be used to augment the RDF data 200 with the following new RDF triples:

:Mike rdf:type :Employee
:Lisa rdf:type :Employee

Figure 12:
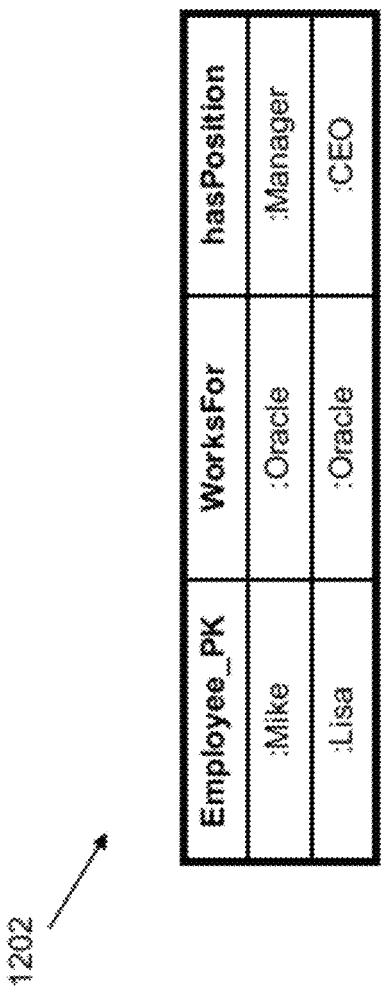

These RDF triples can be added to the RDF data 200, as shown in revised RDF data 1104, which now includes the new triples 1106. Now, the process that was previously discussed to perform mappings using the "rdf:type" predicate can be re-initiated to create a new Employees view 1202 as shown in FIG. 12 for this new Employee class. The "Worksfor" and "hasPosition" properties are mapped as properties/columns in this new view 1202.

The approach FIG. 9B may be performed, for example, if certain quality measurements indicate that the transformation efficiency using the approach of FIG. 9A is insufficient. A transformation factor may be used to measure the transformation efficiency of the above-described RDF-to-relational transformations. The transformation factor according to some embodiments identifies the portion of triples that are covered by the relational views that have been created. The transformation factor may be defined in some embodiments using the following formula:

(Number of Triples Covered by Relational Views)/
(Total Number of Triples)

In the approach illustrated in FIG. 2, it can be seen that the RDF data includes a total of eleven RDF triples. However, only seven of those RDF triples are covered by the relational views 202 and 204 (i.e., triples 210, 212, 214, 216, 218, 220, and 222). The four RDF views identified as 224 are not covered by the relational views 202 and 204. Therefore, the transformation factor for the example of FIG. 2 is (11−4)/11=7/11 or 0.63. This means that 63.63% of the RDF triples in RDF data 200 are covered by the relational views 202 and 204.

Another possible measure of the quality of the transformations is check for the amount of NULL values that have been inserted into the relational views. The idea is that if the created views are unduly filled with NULL values, then this indicates a possible lack of efficiency for the way the transformation has occurred. In some embodiments, this factor (referred to herein as the Null presence factor) is defined using the following formula:

(Number of Nulls in Views)/(Total number of Cells in Views)

In the approach illustrated in FIG. 2, it can be seen that the RDF data includes only a single NULL value, i.e., in row 254 of view 202. There are a total of ten cells in the combined two views 202 and 204. Therefore, the Null presence factor for the example of FIG. 2 is 1/10 or 10%.

Of course, it should be clear that any suitable transformation factor may be employed to measure the quality of the transformations, and such transformation factors are not limited to just the specific embodiments described above according to certain embodiments of the invention.

In some embodiments, the choice of whether to use the approach of placing all unmapped triples into a single unmapped triples view (e.g., the approach of FIG. 9A) or to use an approach to attempt to map the unmapped triples (e.g., the approach of FIG. 9B) may be determined using the transformation factor(s). For example, if the transformation factor is measured to be less than a specified threshold (e.g., 0.7), then the embodiments can be configured to undergo the process using a rules-based approach to map the unmapped triples.

Assume that the approach of FIG. 9B is implemented after it was determined that the transformation factor of the results shown in FIG. 2 is too low (e.g., the transformation factor 0.63 of FIG. 2 is less than the threshold of 0.7). This may cause the approach of FIG. 9B to be implemented, which results in the additional view 1202 of FIG. 12 to be created. At this point, the transformation factor changes, since all 13 of the RDF triples in RDF data 1104 of FIG. 11 are covered by the views 202, 204, and 1202. This means that the transformation factor (13−0)/13=13/13 or 1.0. As such, the transformation factor of 1.0 now significantly improved, and currently exceeds the above-stated threshold value for this factor.

In some embodiment, ID-based relational views can be utilized, which could be suitable for example, with respect to analytics where user is typically interested in counts of things in various categories as opposed to lexical values. The basis for this embodiment is that certain systems implement RDF databases using formats such that the RDF data is associated with identifier numbers. For example, the approach described in U.S. Patent Publication 20100036862 stores lexical value based RDF triples data as a set of two tables, in which a first table includes the triples values and a second table includes the lexical values. In general, if a view has K columns, the lexical value-based view would require K self-joins on first triples table plus K joins with second lexical values table, whereas the ID-based view would require only K self-joins on first triples table and can altogether avoid joins with the second lexical values table.

Therefore, what has been described is a novel approach for presenting RDF data as relational view(s). The ability to present RDF data sets as relational views will enable publishing and reporting of RDF data with existing relational tools and will support high performance RDF queries through identification of relational views of RDF data that should be materialized. This is a very significant benefit, particularly as more and more organizations are creating RDF/OWL repositories for their data.

The declarative approach presented here scales well to handle large RDF data sets. In addition, ID-based views can be utilized to provide orders of magnitude improvement in performance, e.g., when only counts are of importance, which is often the case with analytics.

System Architecture Overview

Figure 13:
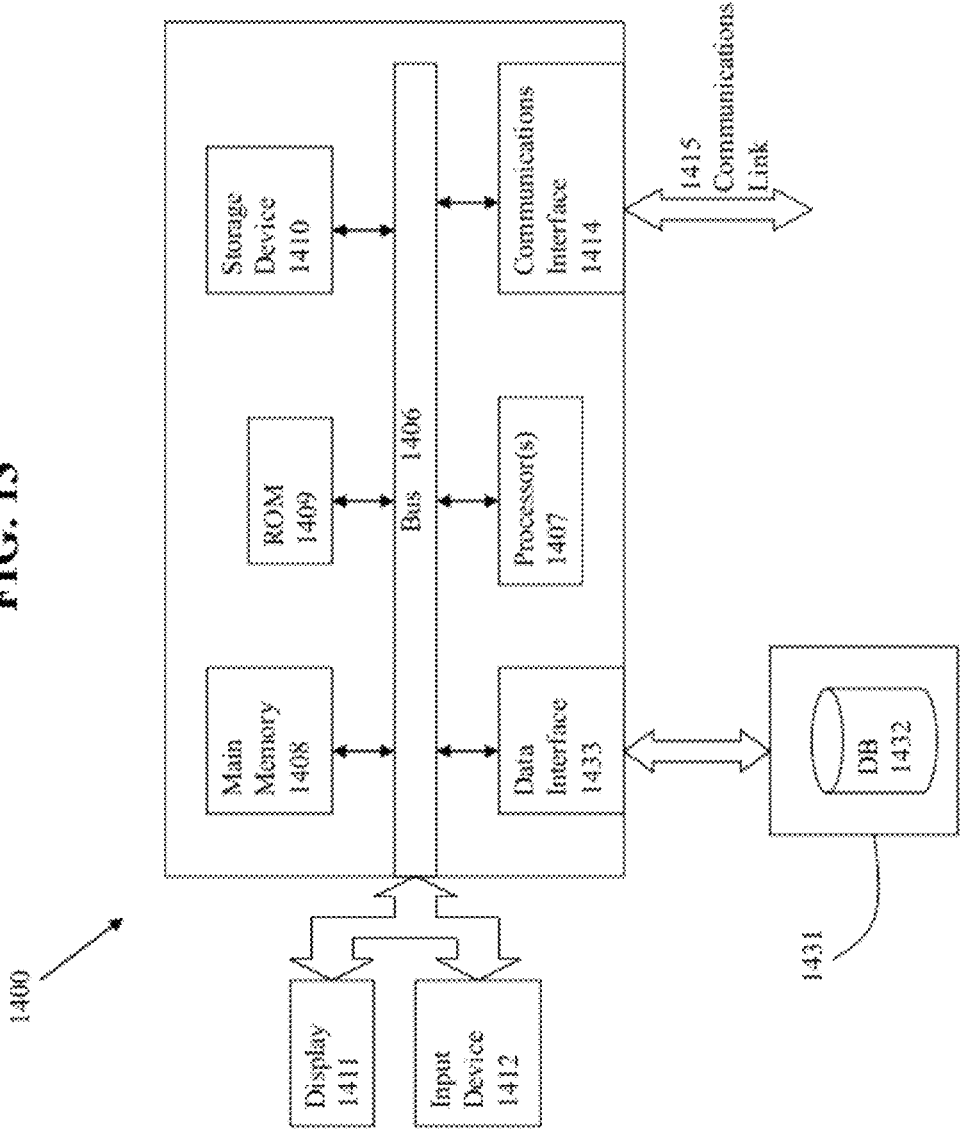
FIG. 13 depicts a computerized system on which an embodiment of the invention can be implemented.

FIG. 13 is a block diagram of an illustrative computing system 1400 suitable for implementing an embodiment of the present invention. Computer system 1400 includes a bus 1406 or other communication mechanism for communicating information, which interconnects subsystems and devices, such as processor 1407, system memory 1408 (e.g., RAM), static storage device 1409 (e.g., ROM), disk drive 1410 (e.g., magnetic or optical), communication interface 1414 (e.g., modem or Ethernet card), display 1411 (e.g., CRT or LCD), input device 1412 (e.g., keyboard), and cursor control.

According to one embodiment of the invention, computer system 1400 performs specific operations by processor 1407 executing one or more sequences of one or more instructions contained in system memory 1408. Such instructions may be read into system memory 1408 from another computer readable/usable medium, such as static storage device 1409 or disk drive 1410. In alternative embodiments, hard-wired circuitry may be used in place of or in combination with software instructions to implement the invention. Thus, embodiments of the invention are not limited to any specific combination of hardware circuitry and/or software. In one embodiment, the term "logic" shall mean any combination of software or hardware that is used to implement all or part of the invention.

The term "computer readable medium" or "computer usable medium" as used herein refers to any medium that participates in providing instructions to processor 1407 for execution. Such a medium may take many forms, including but not limited to, non-volatile media and volatile media. Non-volatile media includes, for example, optical or magnetic disks, such as disk drive 1410. Volatile media includes dynamic memory, such as system memory 1408.

Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can read.

In an embodiment of the invention, execution of the sequences of instructions to practice the invention is performed by a single computer system 1400. According to other embodiments of the invention, two or more computer systems 1400 coupled by communication link 1415 (e.g., LAN, PTSN, or wireless network) may perform the sequence of instructions required to practice the invention in coordination with one another.

Computer system 1400 may transmit and receive messages, data, and instructions, including program, i.e., application code, through communication link 1415 and communication interface 1414. Received program code may be executed by processor 1407 as it is received, and/or stored in disk drive 1410, or other non-volatile storage for later execution.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

What is claimed is:

1. A computer implemented method for implementing relational views from RDF data using a processor, comprising:

identifying a class from a class identifier in RDF data;

identifying information for two or more properties relating to a subject of the class, wherein the two or more properties comprises a single-value property and a multi-value property;

creating a first view definition for the class from the RDF data, where the first view definition corresponds to a first relational view of the RDF data that maps the single-value property; and creating a second view definition for property information corresponding to the multi-value property from the RDF data, where the second view definition corresponds to a second relational view of the RDF data that maps the multi-value property, wherein the second relational view is populated with multi-value property objects of the subject in the first relational view.

2. The method of claim 1 in which a SPARQL query is employed to identify the class or the property information from the RDF data.

3. The method of claim 1 in which a table function is employed to use a SPARQL query in conjunction with a SQL statement.

4. The method of claim 1 in which metadata is created to identify the class or property information.

5. The method of claim 1 in which the view definition is used to generate a view that is accessed by a relational database tool.

6. The method of claim 1 in which the view definition is used to export RDF-based relational data to a relational database.

7. The method of claim 1 in which each identified class corresponds to a separate view.

8. The method of claim 1 in which the single-valued property is mapped to a class view and the multi-valued property is mapped to a multi-valued view.

9. The method of claim 1 in which an unmapped RDF triple is mapped to an unmapped triples view.

10. The method of claim 1 in which an unmapped RDF triple is analyzed to create an additional RDF triple for the RDF data, in which the additional RDF triple is used to map a class view.

11. The method of claim 10 in which a rule is created to implement creation of the additional RDF triple.

12. The method of claim 1 in which analysis is performed to measure quality of view definitions.

13. The method of claim 12 in which a transformation factor is employed to measure the quality of the view definitions by measuring relative amounts of RDF triples that are or are not mapped to the relational views.

14. The method of claim 12 in which a null presence factor is employed to measure the quality of the view definitions by measuring relative amounts of null values in the relational views.

15. The method of claim 12 in which the analysis to measure the quality is performed to determine whether to increase mappings of unmapped RDF triples.

16. A computer program product embodied on a non-transitory computer usable medium, the computer usable medium having stored thereon a sequence of instructions which, when executed by a processor causes the processor to execute a method for implementing relational views from RDF data, the method comprising:

identifying a class from a class identifier in RDF data identifying information for two or more properties relating to a subject of the class, wherein the two or more properties comprises a single-value property and a multi-value property;

creating a first view definition for the class from the RDF data, where the first view definition corresponds to a first relational view of the RDF data that maps the single-value property; and creating a second view definition for property information corresponding to the multi-value property from the RDF data, where the second view definition corresponds to a second relational view of the RDF data that maps the multi-value property, wherein the second relational view is populated with multi-value property objects of the subject in the first relational view.

17. The computer program product of claim 16 in which a SPARQL query is employed to identify the class or the property information from the RDF data.

18. The computer program product of claim 16 in which a table function is employed to use a SPARQL query in conjunction with a SQL statement.

19. The computer program product of claim 16 in which metadata is created to identify the class or property information.

20. The computer program product of claim 16 in which the view definition is used to generate a view that is accessed by a relational database tool or in which the view definition is used to export RDF-based relational data to a relational database.

21. The computer program product of claim 16 in which each identified class corresponds to a separate view.

22. The computer program product of claim 16 in which the single-valued property is mapped to a class view and the multi-valued property is mapped to a multi-valued view.

23. The computer program product of claim 16 in which an unmapped RDF triple is mapped to an unmapped triples view or in which the unmapped RDF triple is analyzed to create an additional RDF triple for the RDF data, in which the additional RDF triple is used to map a class view.

24. The computer program product of claim 23 in which a rule is created to implement creation of the additional RDF triple.

25. The computer program product of claim 16 in which analysis is performed to measure quality of view definitions.

26. The computer program product of claim 25 in which a transformation factor is employed to measure the quality of the view definitions by measuring relative amounts of RDF triples that are or are not mapped to the relational views.

27. The computer program product of claim 25 in which a null presence factor is employed to measure the quality of the view definitions by measuring relative amounts of null values in the relational views.

28. The computer program product of claim 25 in which the analysis to measure the quality is performed to determine whether to increase mappings of unmapped RDF triples.

29. A computer-based system for implementing relational views from RDF data, comprising:
   a computer processor to execute a set of program code instructions;
   a memory to hold the program code instructions, in which the program code instructions comprises program code to identify a class from a class identifier in RDF data, identify information for two or more properties relating to a subject of the class, wherein the two or more properties comprises a single-value property and a multi-value property, create a first view definition for the class from the RDF data, where the first view definition corresponds to a first relational view of the RDF data that maps the single-value property, and create a second view definition for property information corresponding to the multi-value property from the RDF data, where the second view definition corresponds to a second relational view of the RDF data that maps the multi-value property, wherein the second relational view is populated with multi-value property objects of the subject in the first relational view.

30. The computer-based system of claim 29 in which the program code instructions further comprises program code to employ a SPARQL query to identify the class or the property information from the RDF data.

31. The computer-based system of claim 29 in which the program code instructions further comprises program code to employ a table function to use a SPARQL query in conjunction with a SQL statement.

32. The computer-based system of claim 29 in which the program code instructions further comprises program code to create metadata to identify the class or property information.

33. The computer-based system of claim 29 in which the program code instructions further comprises program code to use the view definition to generate a view that is accessed by a relational database tool or in which the view definition is used to export RDF-based relational data to a relational database.

34. The computer-based system of claim 29 in which each identified class corresponds to a separate view.

35. The computer-based system of claim 29 in which the single-valued property is mapped to a class view and the multi-valued property is mapped to a multi-valued view.

36. The computer-based system of claim 29 in which the program code instructions further comprises program code to map an unmapped RDF triple to an unmapped triples view or to analyze the unmapped RDF triple to create an additional RDF triple for the RDF data, in which the additional RDF triple is used to map a class view.

37. The computer-based system of claim 36 in which the program code instructions further comprises program code to create a rule to implement creation of the additional RDF triple.

38. The computer-based system of claim 29 in which the program code instructions further comprises program code to perform analysis to measure quality of view definitions.

39. The computer-based system of claim 38 in which the program code instructions further comprises program code to employ a transformation factor to measure the quality of the view definitions by measuring relative amounts of RDF triples that are or are not mapped to the relational views.

40. The computer-based system of claim 38 in which the program code instructions further comprises program code to employ a null presence factor to measure the quality of the view definitions by measuring relative amounts of null values in the relational views.

41. The computer-based system of claim 38 in which the program code instructions further comprises program code to perform the analysis to measure the quality to determine whether to increase mappings of unmapped RDF triples.

* * * * *